(12) United States Patent
Morohoshi et al.

(10) Patent No.: US 8,477,181 B2
(45) Date of Patent: Jul. 2, 2013

(54) VIDEO PROCESSING APPARATUS AND VIDEO PROCESSING METHOD

(75) Inventors: Toshihiro Morohoshi, Kawasaki (JP); Yutaka Irie, Yokohama (JP); Shinzo Matsubara, Tokyo (JP); Yuichi Inoue, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 2 days.

(21) Appl. No.: 13/402,272

(22) Filed: Feb. 22, 2012

(65) Prior Publication Data

US 2013/0050449 A1    Feb. 28, 2013

(30) Foreign Application Priority Data

Aug. 31, 2011    (JP) .................................. 2011-189660

(51) Int. Cl.
*H04N 13/04*    (2006.01)
(52) U.S. Cl.
USPC ................... 348/54; 348/59; 348/51; 348/46; 348/43; 348/49; 348/42
(58) Field of Classification Search
USPC .......................... 348/54, 59, 51, 46, 43, 49, 42
See application file for complete search history.

(56) References Cited

U.S. PATENT DOCUMENTS

2009/0195642 A1* 8/2009 Fukushima et al. ............ 348/51
2011/0199465 A1* 8/2011 Barenbrug et al. ............ 348/54
2012/0147154 A1* 6/2012 Matsubara ...................... 348/51

FOREIGN PATENT DOCUMENTS

| JP | 08-223608 A | 8/1996 |
| JP | 09-283993 A | 10/1997 |
| JP | 10-042315 | 2/1998 |
| JP | 10-150676 A | 6/1998 |
| JP | 10-174127 A | 6/1998 |
| JP | 2002-010293 | 1/2002 |
| JP | 2007-094022 | 4/2007 |
| JP | 2009-250987 | 10/2009 |

OTHER PUBLICATIONS

Japanese Office Action mailed Jun. 5, 2012 for Japanese Application No. 2011-189660 filed on Aug. 31, 2011.

* cited by examiner

*Primary Examiner* — Shawn An
(74) *Attorney, Agent, or Firm* — Knobbe, Martens Olson & Bear LLP

(57) ABSTRACT

According to one embodiment, a video processing apparatus includes a viewer detector that performs face recognition using a video photographed by a camera and acquires position information of a viewer, a correction amount calculator that calculates a correction amount for compensating for an error of the position information involved in deviation of an attaching position of the camera, a position information corrector that corrects the position information using the correction amount calculated by the correction amount calculator, a viewing area information calculator that calculates, using the position information corrected by the position information corrector, a control parameter for setting a viewing area in which the viewer is set, and a viewing area controller that controls the viewing area according to the control parameter.

8 Claims, 13 Drawing Sheets

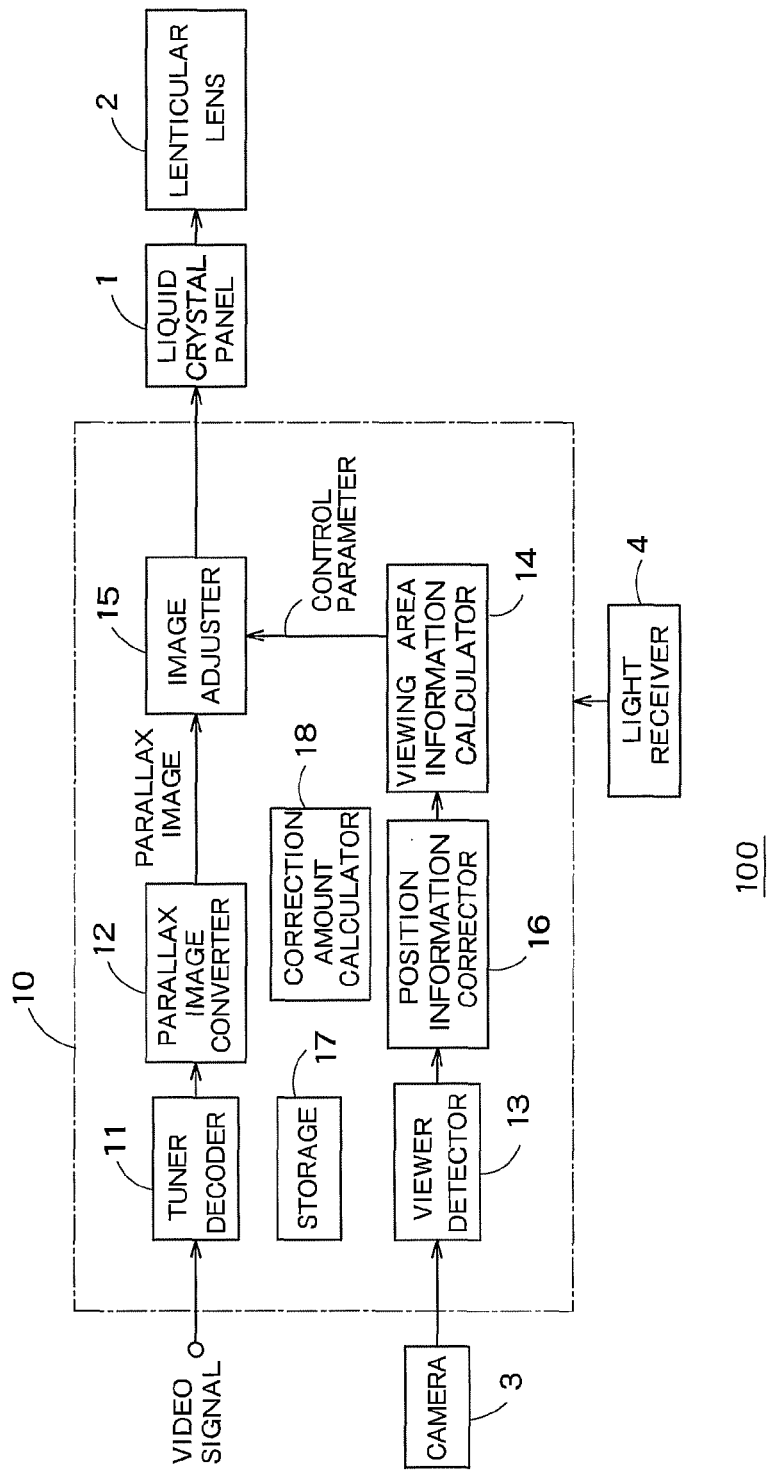
F I G. 2

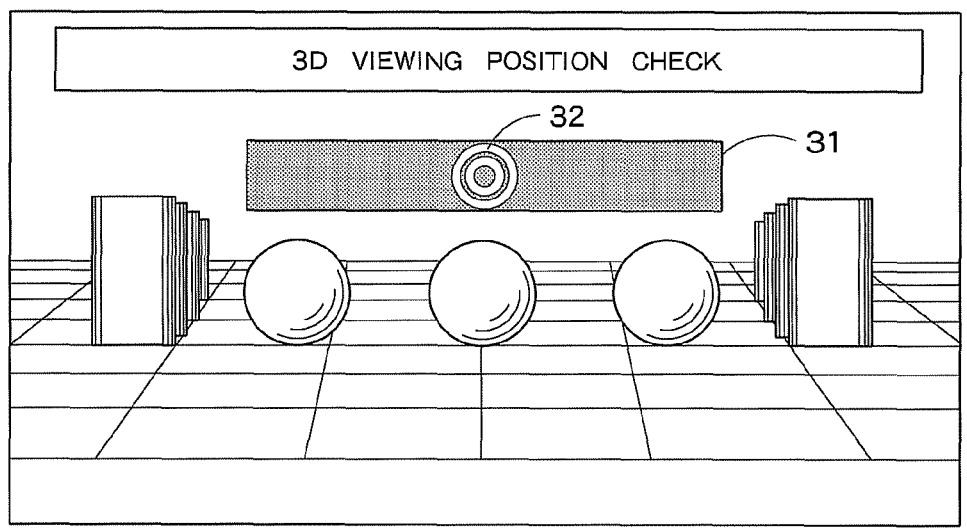
F I G. 7

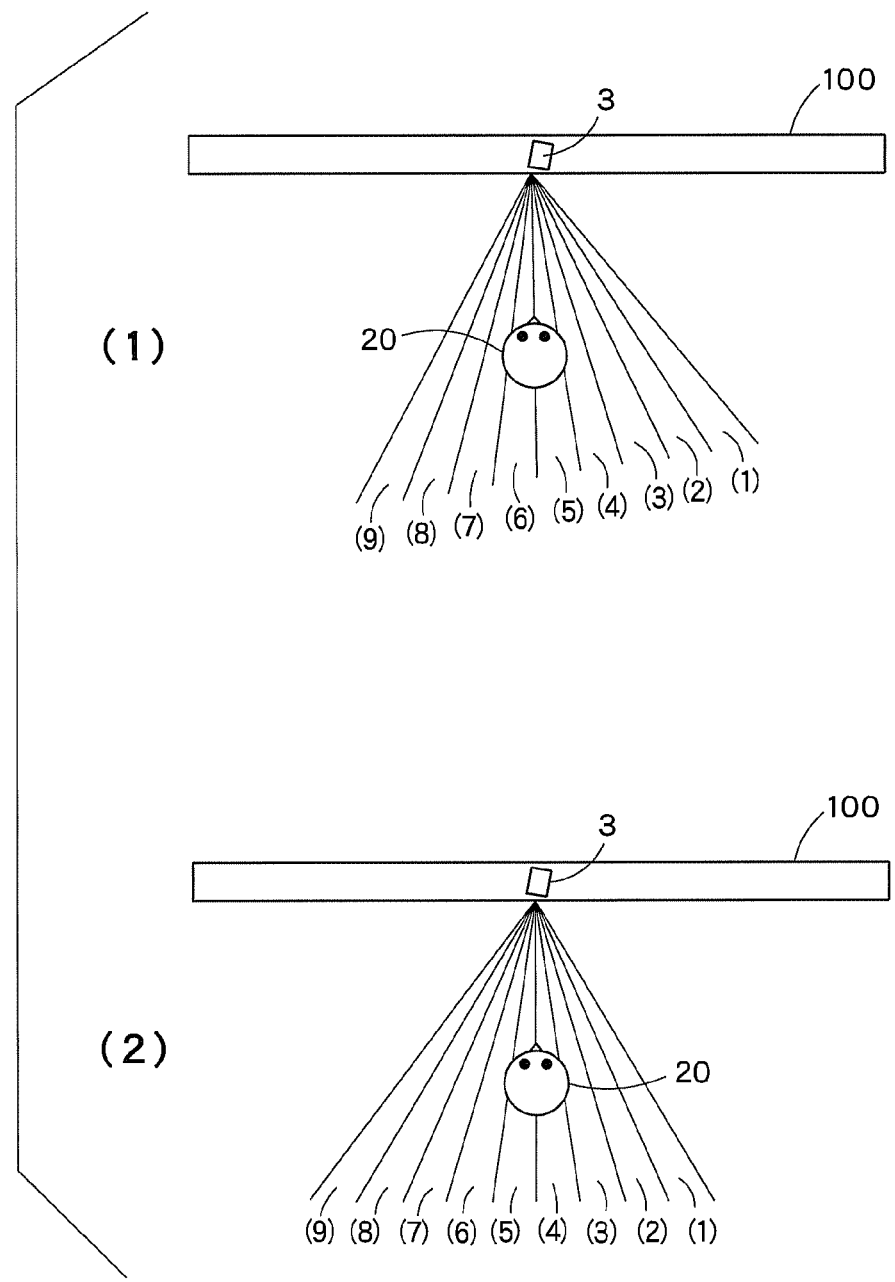
F I G. 11

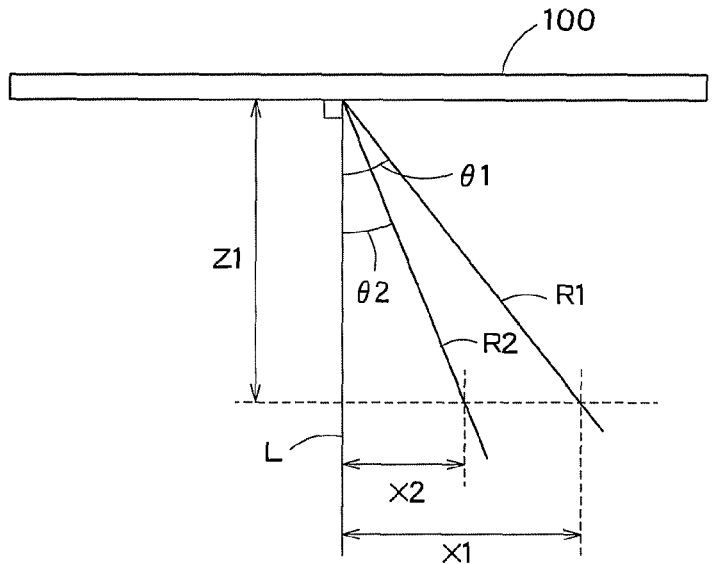
F I G. 12
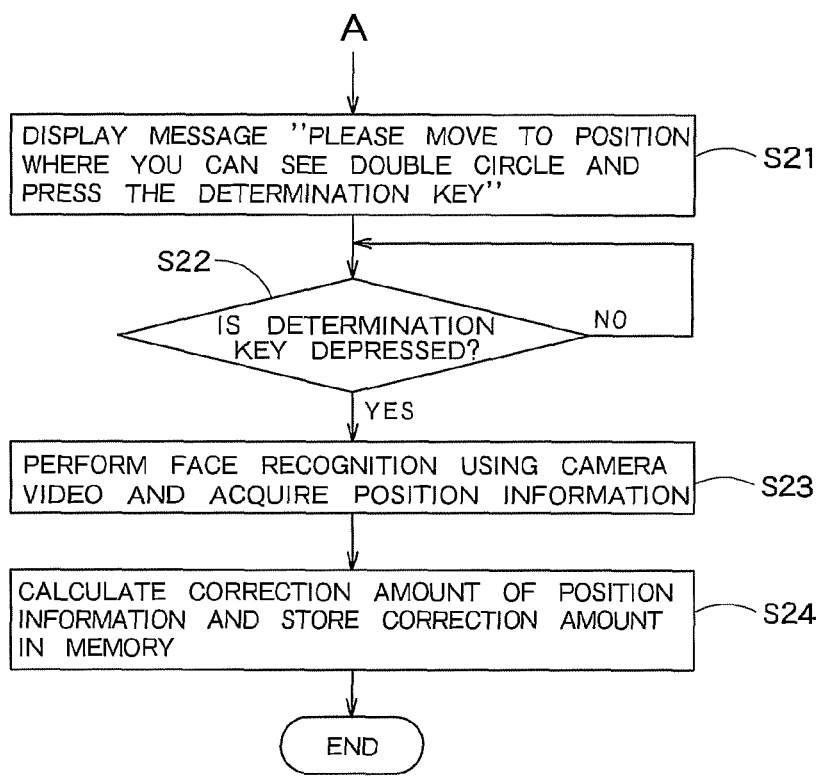
F I G. 13

VIDEO PROCESSING APPARATUS AND VIDEO PROCESSING METHOD

CROSS-REFERENCE TO RELATED APPLICATIONS

This application is based upon and claims the benefit of priority from the prior Japanese Patent Application No. 2011-189660, filed on Aug. 31, 2011; the entire contents of which are incorporated herein by reference.

FIELD

Embodiments described herein relate generally to a video processing apparatus and a video processing method.

BACKGROUND

In recent years, a stereoscopic video display apparatus (a so-called autostereoscopic 3D television) that enables a viewer to see a stereoscopic video with naked eyes without using special glasses is becoming widely used. The stereoscopic video display apparatus displays plural images (parallax images) from different viewpoints. Rays of the images are guided to both eyes of the viewer with an output direction thereof controlled by, for example, a parallax barrier or a lenticular lens. If the position of the viewer is appropriate, since the viewer sees different parallax images with his left eye and his right eye, the viewer can stereoscopically recognize a video. An area where the viewer can see a stereoscopic video is referred to as a viewing area.

The viewing area is a limited area. When the viewer is outside the viewing area, the viewer cannot see the stereoscopic video. Therefore, the stereoscopic video display apparatus has a function of detecting the position of the viewer using a camera provided in the stereoscopic video display apparatus and controlling the viewing area to include the viewer in the viewing area (a face tracking function).

However, an attaching position of the camera sometimes deviates because of, for example, replacement of the camera. In this case, the position of the viewer is erroneously recognized according to a positional deviation amount of the camera. Therefore, the viewer is not set in the viewing area generated on the basis of the position of the viewer. As a result, it is likely that the viewer cannot see a satisfactory stereoscopic video.

BRIEF DESCRIPTION OF THE DRAWINGS

FIG. 2 is a block diagram showing a schematic configuration of the video processing apparatus 100 according to the embodiment;

FIG. 7 shows an example of a 3D viewing position check screen;

FIGS. 11(1) and 11(2) are both diagrams of the rays of the first to ninth parallax images on the 3D viewing position check screen and the viewer 20 viewed from above;

FIG. 12 is a diagram showing a relation among parameters for calculating a correction amount; and FIG. 13 is a flowchart for explaining a camera calibration method according to a modification.

DETAILED DESCRIPTION

According to one embodiment, a video processing apparatus includes a viewer detector that performs face recognition using a video photographed by a camera and acquires position information of a viewer, a correction amount calculator that calculates a correction amount for compensating for an error of the position information involved in deviation of an attaching position of the camera, a position information corrector that corrects the position information using the correction amount calculated by the correction amount calculator, a viewing area information calculator that calculates, using the position information corrected by the position information corrector, a control parameter for setting a viewing area in which the viewer is set, a viewing area controller that controls the viewing area according to the control parameter, a display that displays plural parallax images that the viewer present in the viewing area can observe as a stereoscopic video, and an apertural area controller that outputs the plural parallax images displayed on the display in a predetermined direction.

Embodiments will now be explained with reference to the accompanying drawings.

Figure 1:
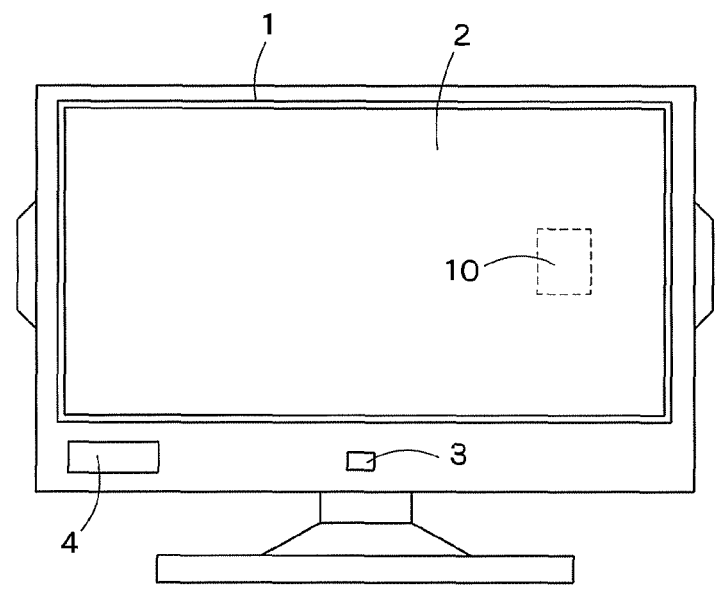
FIG. 1 is an external view of a video processing apparatus 100 according to an embodiment.

FIG. 1 is an external view of a video display apparatus 100 according to an embodiment. FIG. 2 is a block diagram showing a schematic configuration of the video display apparatus 100. The video display apparatus 100 includes a liquid crystal panel 1, a lenticular lens 2, a camera 3, a light receiver 4, and a controller 10.

The liquid crystal panel (a display) 1 displays plural parallax images that a viewer present in a viewing area can observe as a stereoscopic video. The liquid crystal panel 1 is, for example a 55-inch size panel. 11520 (=1280*9) pixels are arranged in the horizontal direction and 720 pixels are arranged in the vertical direction. In each of the pixels, three sub-pixels, i.e., an R sub-pixel, a G sub-pixel, and a B sub-pixel are formed in the vertical direction. Light is irradiated on the liquid crystal panel 1 from a backlight device (not shown) provided in the back. The pixels transmit light having luminance corresponding to a parallax image signal (explained later) supplied from the controller 10.

The lenticular lens (an apertural area controller) 2 outputs the plural parallax images displayed on the liquid crystal panel 1 (the display) in a predetermined direction. The lenticular lens 2 includes plural convex portions arranged along the horizontal direction of the liquid crystal panel 1. The number of the convex portions is ⅑ of the number of pixels in the horizontal direction of the liquid crystal panel 1. The lenticular lens 2 is stuck to the surface of the liquid crystal panel 1 such that one convex portion corresponds to nine pixels arranged in the horizontal direction. The light transmitted through the pixels is output, with directivity, in a specific direction from near the vertex of the convex portion.

The liquid crystal panel 1 according to this embodiment can display a stereoscopic video in an integral imaging manner of three or more parallaxes or a stereo imaging manner. Besides, the liquid crystal panel 1 can also display a normal two-dimensional video.

In the following explanation, an example in which nine pixels are provided to correspond to the convex portions of the liquid crystal panel 1 and an integral imaging manner of nine parallaxes can be adopted is explained. In the integral imaging manner, first to ninth parallax images are respectively displayed on the nine pixels corresponding to the convex portions. The first to ninth parallax images are images of a subject seen respectively from nine viewpoints arranged along the horizontal direction of the liquid crystal panel 1. The viewer can stereoscopically view a video by seeing one parallax image among the first to ninth parallax images with his left eye and seeing another one parallax image with his right eye. According to the integral imaging manner, a viewing area can be expanded as the number of parallaxes is increased. The viewing area means an area where a video can be stereoscopically viewed when the liquid crystal panel 1 is seen from the front of the liquid crystal panel 1.

On the other hand, in the stereo imaging manner, parallax images for the right eye are displayed on four pixels among the nine pixels corresponding to the convex portions and parallax images for the left eye are displayed on the other five pixels. The parallax images for the left eye and the right eye are images of the subject viewed respectively from a viewpoint on the left side and a viewpoint on the right side of two viewpoints arranged in the horizontal direction. The viewer can stereoscopically view a video by seeing the parallax images for the left eye with his left eye and seeing the parallax images for the right eye with his right eye through the lenticular lens 2. According to the stereo imaging manner, feeling of three-dimensionality of a displayed video is more easily obtained than the integral imaging manner. However, a viewing area is narrower than that in the integral imaging manner.

The liquid crystal panel 1 can also display the same image on the nine pixels corresponding to the convex portions and display a two-dimensional image.

In this embodiment, the viewing area can be variably controlled according to a relative positional relation between the convex portions of the lenticular lens 2 and displayed parallax images, i.e., what kind of parallax images are displayed on the nine pixels corresponding to the convex portions. The control of the viewing area is explained below taking the integral imaging manner as an example.

Figure 3:
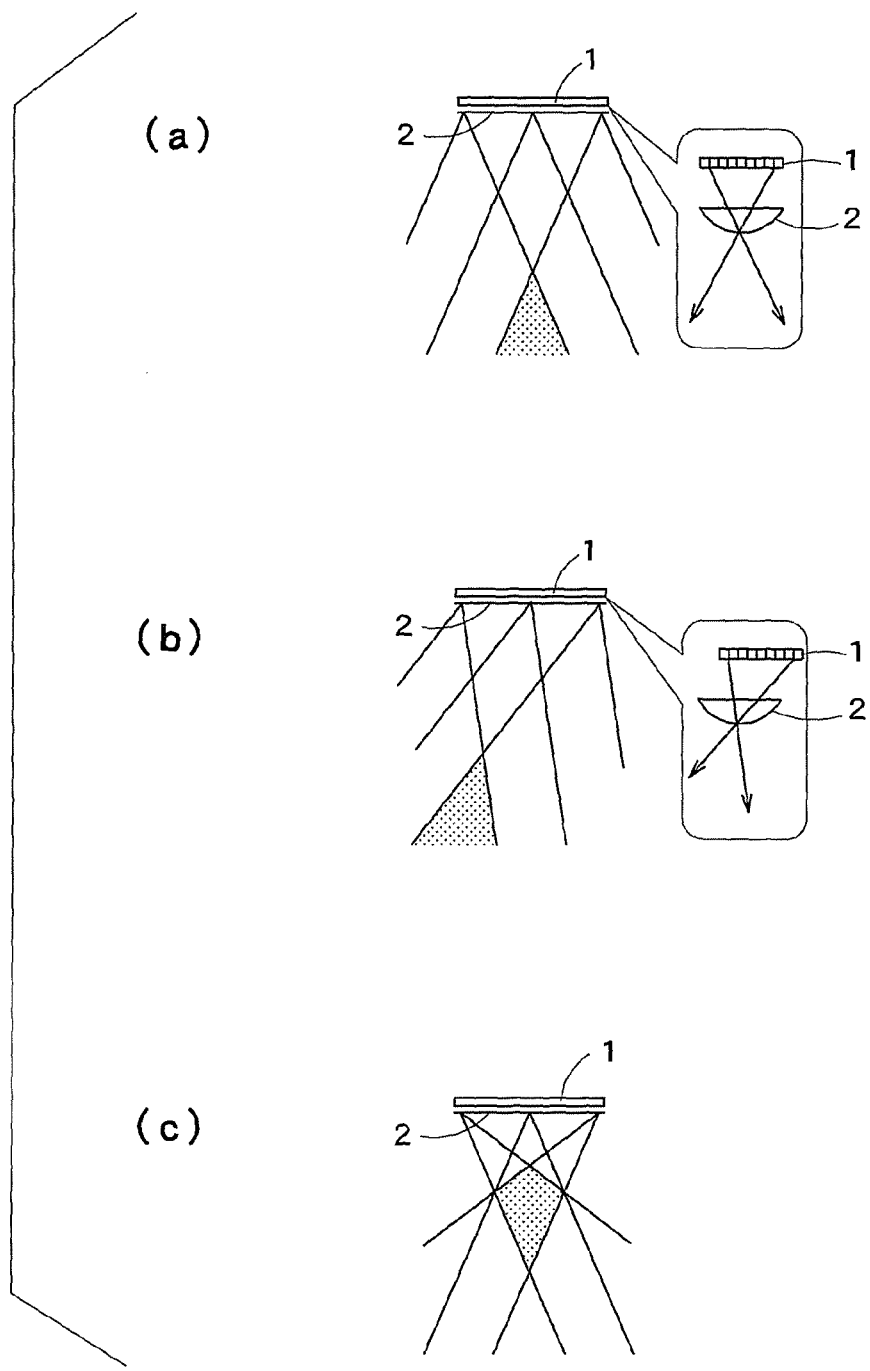
FIGS. 3(a) to 3(c) are diagrams of a part of a liquid crystal panel 1 and a lenticular lens 2 viewed from above.

FIG. 3 is a diagram of a part of the liquid crystal panel 1 and the lenticular lens 2 viewed from above. A hatched area in the figure indicates the viewing area. The viewer can stereoscopically view a video when the viewer sees the liquid crystal panel 1 from the viewing area. Other areas are areas where a pseudoscopic image and crosstalk occur and areas where it is difficult to stereoscopically view a video.

FIG. 3 shows a relative positional relation between the liquid crystal panel 1 and the lenticular lens 2, more specifically, a state in which the viewing area changes according to a distance between the liquid crystal panel 1 and the lenticular lens 2 or a deviation amount in the horizontal direction between the liquid crystal panel 1 and the lenticular lens 2.

Actually, the lenticular lens 2 is stuck to the liquid crystal panel 1 while being highly accurately aligned with the liquid crystal panel 1. Therefore, it is difficult to physically change relative positions of the liquid crystal panel 1 and the lenticular lens 2.

Therefore, in this embodiment, display positions of the first to ninth parallax images displayed on the pixels of the liquid crystal panel 1 are shifted to apparently change a relative positional relation between the liquid crystal panel 1 and the lenticular lens 2 to thereby perform adjustment of the viewing area.

For example, compared with a case in which the first to ninth parallax images are respectively displayed on the nine pixels corresponding to the convex portions (FIG. 3(a)), when the parallax images are shifted to the right side as a whole and displayed (FIG. 3(b)), the viewing area moves to the left side. Conversely, when the parallax images are shifted to the left side as a whole and displayed, the viewing area moves to the right side.

When the parallax images are not shifted near the center in the horizontal direction and the parallax images are more largely shifted to the outer side and displayed further on the outer side of the liquid crystal panel 1 (FIG. 3(c)), the viewing area moves in a direction in which the viewing area approaches the liquid crystal panel 1. Further a pixel between a parallax image to be shifted and a parallax image not to be shifted and a pixel between parallax images having different shift amounts only have to be appropriately interpolated according to pixels around the pixels. Conversely to FIG. 3(c), when the parallax images are not shifted near the center in the horizontal direction and the parallax images are more largely shifted to the center side and displayed further on the outer side of the liquid crystal panel 1, the viewing area moves in a direction in which the viewing area is away from the liquid crystal panel 1.

Figure 4:
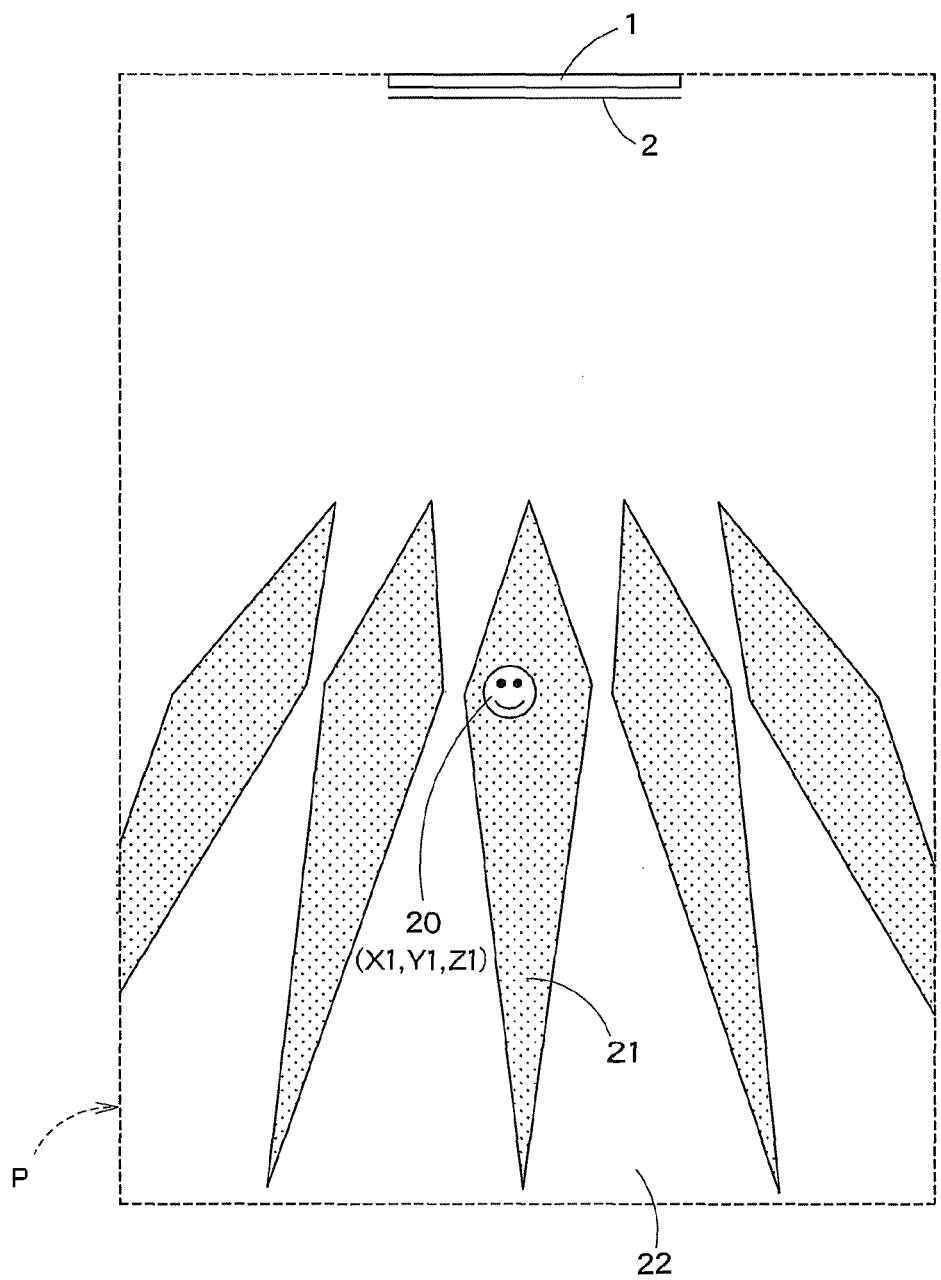
FIG. 4 is a top view showing an example of plural viewing areas 21 in a view area P of the video processing apparatus.

By shifting and displaying all or a part of the parallax images in this way, it is possible to move the viewing area in the left right direction or the front back direction with respect to the liquid crystal panel 1. In FIG. 3, only one viewing area is shown to simplify the explanation. However, actually, as shown in FIG. 4, plural viewing areas 21 are present in the view area P and move in association with one another. The viewing area is controlled by the controller 10 shown in FIG. 2 explained later. Further a view area other than the viewing areas 21 is a pseudoscopic image area 22 where it is difficult to see a satisfactory stereoscopic video because of occurrence of a pseudoscopic image, crosstalk, or the like.

Referring back to FIG. 1, the components of the video processing apparatus 100 are explained.

The camera 3 is attached near the center in a lower part of the liquid crystal panel 1 at a predetermined angle of elevation and photographs a predetermined range in the front of the liquid crystal panel 1. A photographed video is supplied to the controller 10 and used to detect information concerning the viewer such as the position, the face, and the like of the viewer. The camera 3 may photograph either a moving image or a still image.

The light receiver 4 is provided, for example, on the left side in a lower part of the liquid crystal panel 1. The light receiver 4 receives an infrared ray signal transmitted from a remote controller used by the viewer. The infrared ray signal includes a signal indicating, for example, whether a stereoscopic video is displayed or a two-dimensional video is displayed, which of the integral imaging manner and the stereo imaging manner is adopted when the stereoscopic video is displayed, and whether control of the viewing area is performed.

Next, details of the components of the controller 10 are explained. As shown in FIG. 2, the controller 10 includes a tuner decoder 11, a parallax image converter 12, a viewer detector 13, a viewing area information calculator 14, an image adjuster 15, a position information corrector 16, a storage 17, and a correction amount calculator 18. The controller 10 is implemented as, for example, one IC (Integrated Circuit) and arranged on the rear side of the liquid crystal panel 1. It goes without saying that a part of the controller 10 is implemented as software.

The tuner decoder (a receiver) 11 receives and tunes an input broadcast wave and decodes an encoded video signal. When a signal of a data broadcast such as an electronic program guide (EPG) is superimposed on the broadcast wave, the tuner decoder 11 extracts the signal. Alternatively, the tuner decoder 11 receives, rather than the broadcast wave, an encoded video signal from a video output apparatus such as an optical disk player or a personal computer and decodes the video signal. The decoded signal is also referred to as baseband video signal and is supplied to the parallax image converter 12. Note that when the video display apparatus 100 does not receive a broadcast wave and solely displays a video signal received from the video output apparatus, a decoder simply having a decoding function may be provided as a receiver instead of the tuner decoder 11.

A video signal received by the tuner decoder 11 may be a two-dimensional video signal or may be a three-dimensional video signal including images for the left eye and the right eye in a frame packing (FP), side-by-side (SBS), or top-and-bottom (TAB) manner and the like. The video signal may be a three-dimensional video signal including images having three or more parallaxes.

In order to stereoscopically display a video, the parallax image converter 12 converts a baseband video signal into plural parallax image signals and supplies the parallax image signals to the image adjuster 15. Processing content of the parallax image converter 12 is different according to which of the integral imaging matter and the stereo imaging manner is adopted. The processing content of the parallax image converter 12 is different according to whether the baseband video signal is a two-dimensional video signal or a three-dimensional video signal.

When the stereo imaging manner is adopted, the parallax image converter 12 generates parallax image signals for the left eye and the right eye respectively corresponding to the parallax images for the left eye and the right eye. More specifically, the parallax image converter 12 generates the parallax image signals as explained below.

When the stereo imaging manner is adopted and a three-dimensional video signal including images for the left eye and the right eye is input, the parallax image converter 12 generates parallax image signals for the left eye and the right eye that can be displayed on the liquid crystal panel 1. When a three-dimensional video signal including three or more images is input, the parallax image converter 12 generates parallax image signals for the left eye and the right eye using, for example, arbitrary two of the three images.

In contrast, when the stereo imaging manner is adopted and a two-dimensional video signal not including parallax information is input, the parallax image converter 12 generates parallax image signals for the left eye and the right eye on the basis of depth values of pixels in the video signal. The depth value is a value indicating to which degree the pixels are displayed to be seen in the front or the depth with respect to the liquid crystal panel 1. The depth value may be added to the video signal in advance or may be generated by performing motion detection, composition identification, human face detection, and the like on the basis of characteristics of the video signal. In the parallax image for the left eye, a pixel seen in the front needs to be displayed to be shifted further to the right side than a pixel seen in the depth. Therefore, the parallax image converter 12 performs processing for shifting the pixel seen in the front in the video signal to the right side and generates a parallax image signal for the left eye. A shift amount is set larger as the depth value is larger.

On the other hand, when the integral imaging manner is adopted, the parallax image converter 12 generates first to ninth parallax image signals respectively corresponding to the first to ninth parallax images. More specifically, the parallax image converter 12 generates the first to ninth parallax image signals as explained below.

When the integral imaging manner is adopted and a two-dimensional video signal or a three-dimensional video signal including images having eight or less parallaxes is input, the parallax image converter 12 generates the first to ninth parallax image signals on the basis of depth information same as that for generating the parallax image signals for the left eye and the right eye from the two-dimensional video signal.

When the integral imaging manner is adopted and a three-dimensional video signal including images having nine parallaxes is input, the parallax image converter 12 generates the first to ninth parallax image signals using the video signal.

The viewer detector 13 performs face recognition using a video photographed by the camera 3 and acquires position information of the viewer. The position information is supplied to the position information corrector 16 and the correction amount calculator 18 explained later. Note that the viewer detector 13 can track the viewer even if the viewer moves. Therefore, it is also possible to grasp a viewing time for each viewer.

The position information of the viewer is represented as, for example, a position on an X axis (in the horizontal direction), a Y axis (in the vertical direction), and a Z axis (a direction orthogonal to the liquid crystal panel 1) with the origin set in the center of the liquid crystal panel 1. The position of a viewer 20 shown in FIG. 4 is represented by a coordinate (X1, Y1, Z1). More specifically, first, the viewer detector 13 detects a face from a video photographed by the camera 3 to thereby recognize the viewer. Subsequently, the viewer detector 13 calculates a position (X1, Y1) on the X axis and the Y axis from the position of the viewer in the video and calculates a position (Z1) on the Z axis from the size of the face. When there are plural viewers, the viewer detector 13 may detect a predetermined number of viewers, for example, ten viewers. In this case, when the number of detected faces is larger than ten, for example, the viewer detector 13 detects positions of the ten viewers in order from a position closest to the liquid crystal panel 1, i.e., a smallest position on the Z axis.

The viewing area information calculator 14 calculates, using the position information of the viewer supplied from the position information corrector 16 explained later, a control parameter for setting a viewing area in which the detected viewer is set. The control parameter is, for example, an amount for shifting the parallax images explained with reference to FIG. 3 and is one parameter or a combination of plural parameters. The viewing area information calculator 14 supplies the calculated control parameter to the image adjuster 15.

More specifically, in order to set a desired viewing area, the viewing area information calculator 14 uses a viewing area database that associates the control parameter and a viewing area set by the control parameter. The viewing area database is stored in the storage 17 in advance. The viewing area information calculator 14 finds, by searching through the viewing area database, a viewing area in which the viewer can be included.

In order to control the viewing area, after performing adjustment for shifting and interpolating a parallax image signal according to the calculated control parameter, the image adjuster (a viewing area controller) 15 supplies the parallax image signal to the liquid crystal panel 1. The liquid crystal panel 1 displays an image corresponding to the adjusted parallax image signal.

The position information corrector 16 corrects, using a correction amount calculated by the correction amount calculator 18 explained later, the position information of the viewer acquired by the viewer detector 13 and supplies the corrected position information to the viewing area information calculator 14. When calculation of a correction amount is not performed yet, the position information corrector 16 directly supplies the position information of the viewer acquired by the viewer detector 13 to the viewing area information calculator 14.

The storage 17 is a nonvolatile memory such as a flash memory and stores the viewing area database, the correction amount of the position information, and the like. The storage 17 may be provided on the outside of the controller 10.

The correction amount calculator 18 calculates a correction amount for compensating for an error in position information of the viewer that occurs according to deviation of an attaching position of the camera 3. For the calculation of the correction amount, as explained in detail later, there are (a) a manner in which the viewer does not move and an output direction of a parallax image is changed and (b) a manner in which an output direction of a parallax image is not changed and the viewer moves. Note that the deviation of the attaching position includes deviation of an attaching direction of the camera (deviation of an optical axis).

Figure 5:
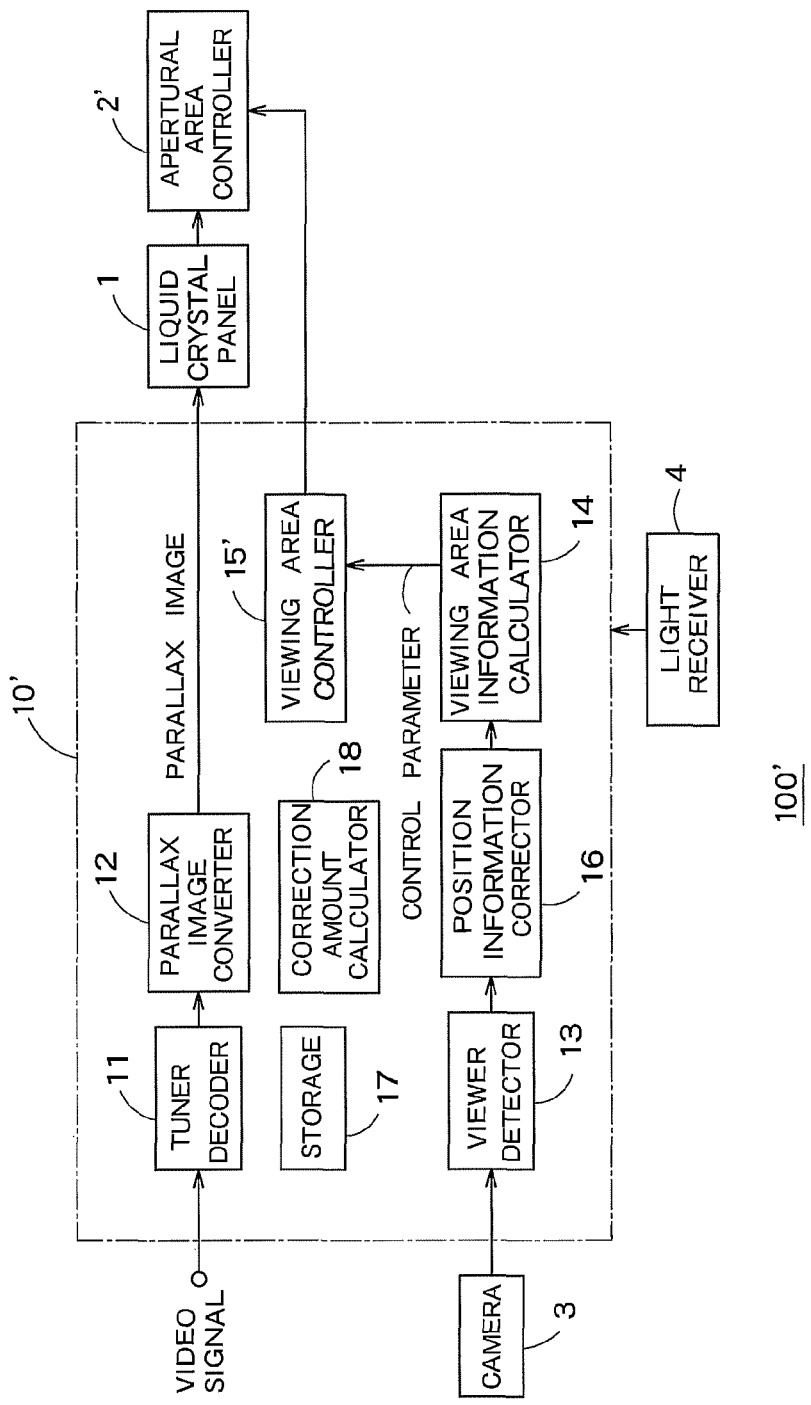
FIG. 5 is a block diagram showing a schematic configuration of a video processing apparatus 100' according to a modification.

The configuration of the video processing apparatus 100 is explained above. In this embodiment, the example in which the lenticular lens 2 is used and the viewing area is controlled by shifting the parallax image is explained. However, the viewing area may be controlled by other methods. For example, a parallax barrier may be provided as an apertural area controller 2' instead of the lenticular lens 2. FIG. 5 is a block diagram showing a schematic configuration of a video processing apparatus 100' according to a modification of this embodiment shown in FIG. 2. As shown in the figure, a controller 10' of the video processing apparatus 100' includes a viewing area controller 15' instead of the image adjuster 15. The viewing area controller 15' controls an apertural area controller 2' according to a control parameter calculated by the viewing area information calculator 14. In the case of this modification, the control parameter is a distance between the liquid crystal panel 1 and the apertural area controller 2', a deviation amount in the horizontal direction between the liquid crystal panel 1 and the apertural area controller 2', and the like.

In this modification, an output direction of a parallax image displayed on the liquid crystal panel 1 is controlled by the apertural area controller 2', whereby the viewing area is controlled. In this way, the apertural area controller 2' may be controlled by the viewing area controller 15' without performing processing for shifting the parallax image.

Figure 6A:
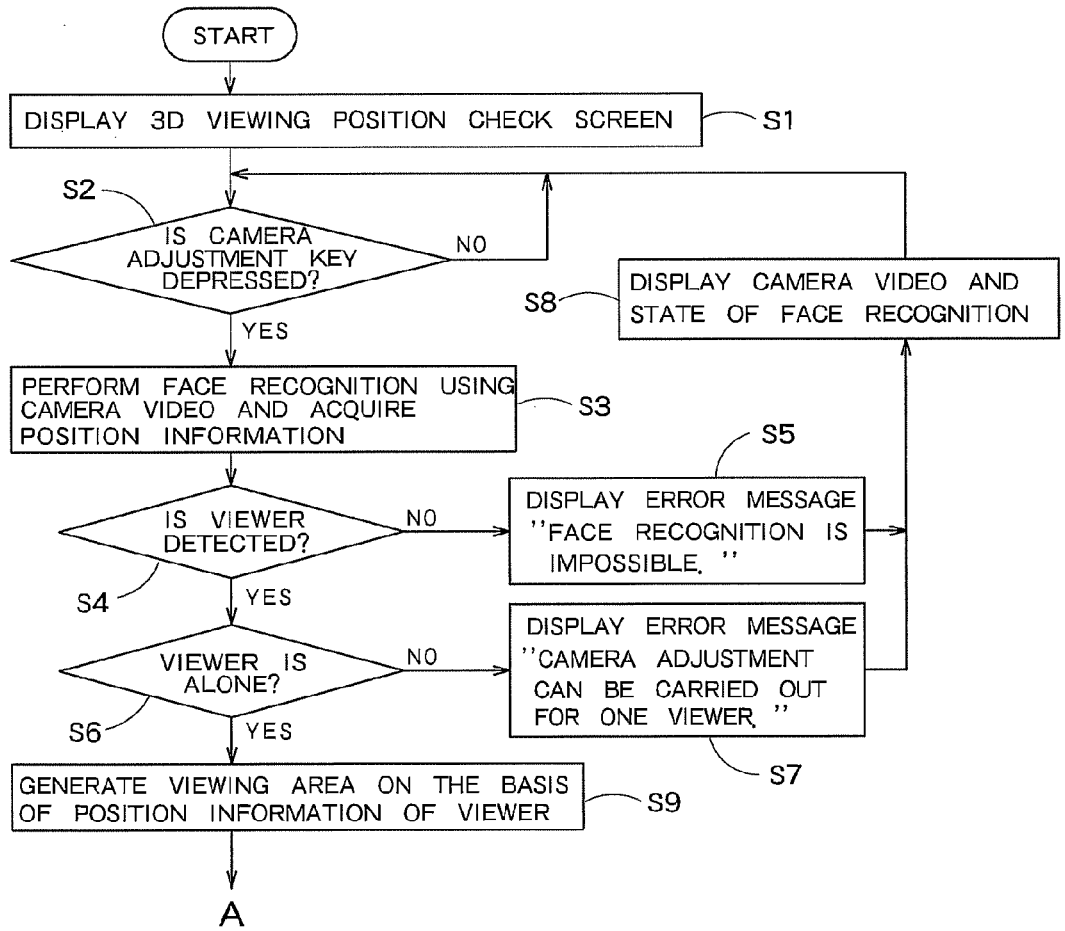
FIG. 6A is a flowchart for explaining a camera calibration method according to the embodiment.
Figure 6B:
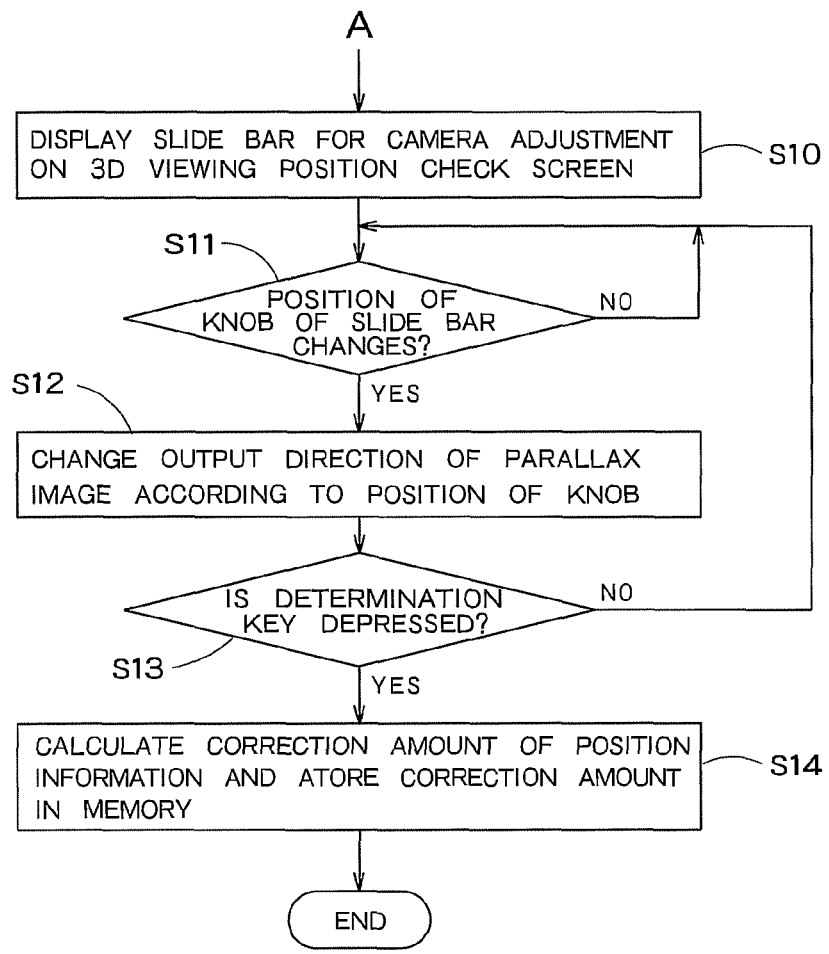
FIG. 6B is a flowchart for explaining the camera calibration method according to the embodiment following FIG. 6A.

Next, a video processing method (a calibration method for a camera) by the video processing apparatus 100 (100') configured as explained above is explained with reference to flowcharts of FIGS. 6A and 6B.

Figure 8:
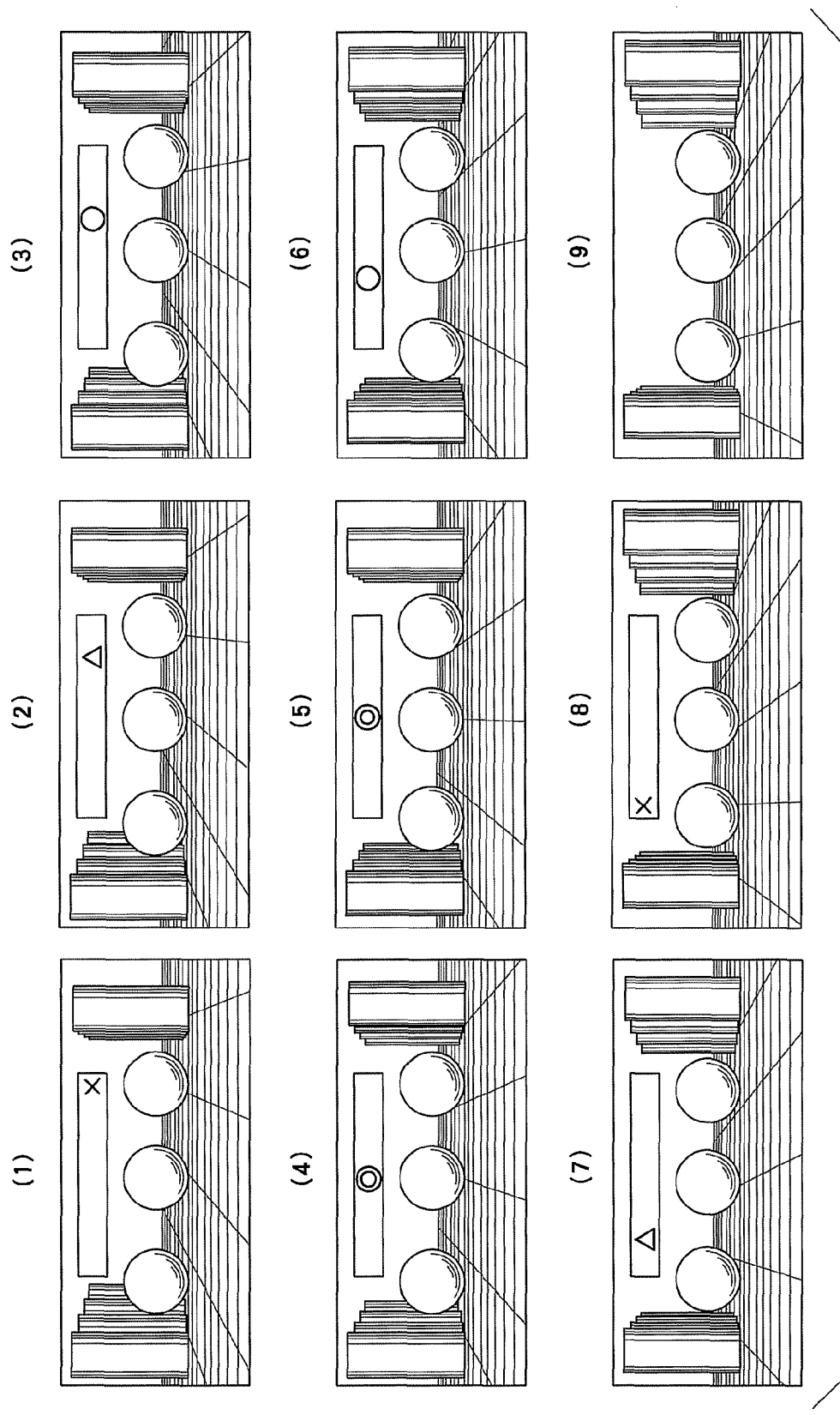
FIGS. 8(1) to 8(9) respectively show first to ninth parallax images on the 3D viewing position check screen.

(1) The liquid crystal panel 1 displays a 3D viewing position check screen (a 3D test pattern) (step S1). The 3D viewing position check screen is a test image for stereoscopic view and includes plural parallax images (e.g., first to ninth parallax images). A guide character indicating which parallax image comes into sight is displayed on the 3D viewing position check screen. The guide character is not limited to a character and may be signs such as a double circle, a circle, and a triangle as illustrated in FIGS. 7 and 8. Besides, the guide character includes objects that a viewer can discriminate such as a picture, a pattern, and a color.

Preferably, a message for urging the viewer to depress a camera adjustment key in a predetermined position is displayed on the 3D viewing position check screen. For example, a message "please stand away from the camera about 1 m and press the camera adjustment key near the front of the camera as much as possible" is displayed.

FIG. 7 shows an example of the 3D viewing position check screen. The 3D viewing position check screen includes a guide display 31 for displaying a guide character 32. As shown in FIG. 7, the 3D viewing position check screen may include a stereoscopic video such as a sphere or a prism.

FIG. 8 is a 3D viewing position check screen in the case of nine parallaxes. FIGS. 8(1) to 8(9) respectively show the first to ninth parallax images. In the fourth parallax image (FIG. 8(4)) and the fifth parallax image (FIG. 8(5)), a guide character of a double circle indicating that a viewing position is an optimum viewing position in the viewing area (e.g., the center of the viewing area) is displayed. As the viewing position further deviates from the optimum viewing position, the guide character changes to a circle, a triangle, and an x-mark. In FIG. 8(9), the guide display 31 is not displayed either. Note that the guide character (e.g., the double circle) indicating that the viewing position is the optimum viewing position in the viewing area may be displayed in the fifth parallax image and the sixth parallax image.

In this way, the 3D viewing position check screen includes the plural parallax images. The two parallax images in the center have a common guide character (in the example explained above, the double circle) not present in the other parallax images. The two parallax images in the center are two parallax images in which a field of view substantially in the center is displayed. Generally speaking, when the 3D viewing position check screen includes first to nth parallax images, the two parallax images in the center are an (n+1)/2th parallax image and an (n+1)/2−1th parallax image (or an (n+1)/2+1th parallax image) when n is an odd number and are an n/2th parallax image and an n/2+1th parallax image when n is an even number.

(2) The light receiver 4 receives an infrared ray signal transmitted from a remote controller and determines whether a camera adjustment key of the remote controller is depressed (step S2). If the camera adjustment key is depressed, processing proceeds to step S3. The viewer may select an item having the same function from a menu screen instead of depressing the camera adjustment key of the remote controller.

(3) The viewer detector 13 performs face recognition using a video (a camera video) photographed by the camera 3 and calculates position information (X1, Y1, Z1) of the viewer (step S3). The viewer detector 13 then determines whether the viewer is detected (step S4). If the viewer is detected, the processing proceeds to step S6. On the other hand, if the viewer is not detected, the liquid crystal panel 1 displays an error message (e.g., "face recognition is impossible.") (step S5).

(4) The viewer detector 13 determines whether the viewer is alone (step S6). As a result, if the viewer is alone, the processing proceeds to step S9. If plural viewers are present, the liquid crystal panel 1 displays an error message (e.g., "camera adjustment can be carried out for one viewer.") (step S7). Note that following the display of the error message in step S5 and step S7, the liquid crystal panel 1 may display the camera video and a state of the face recognition (e.g., a frame pattern affixed to the recognized face of the viewer) (step S8).

(5) A viewing area is generated on the basis of the position information of the viewer obtained in step S3 (step S9). Specifically, the viewing area information calculator 14 calculates, on the basis of the position information acquired by the viewer detector 13, a control parameter for setting a viewing area. Thereafter, as explained above, a viewing area is generated on the basis of the calculated control parameter.

Figure 9:
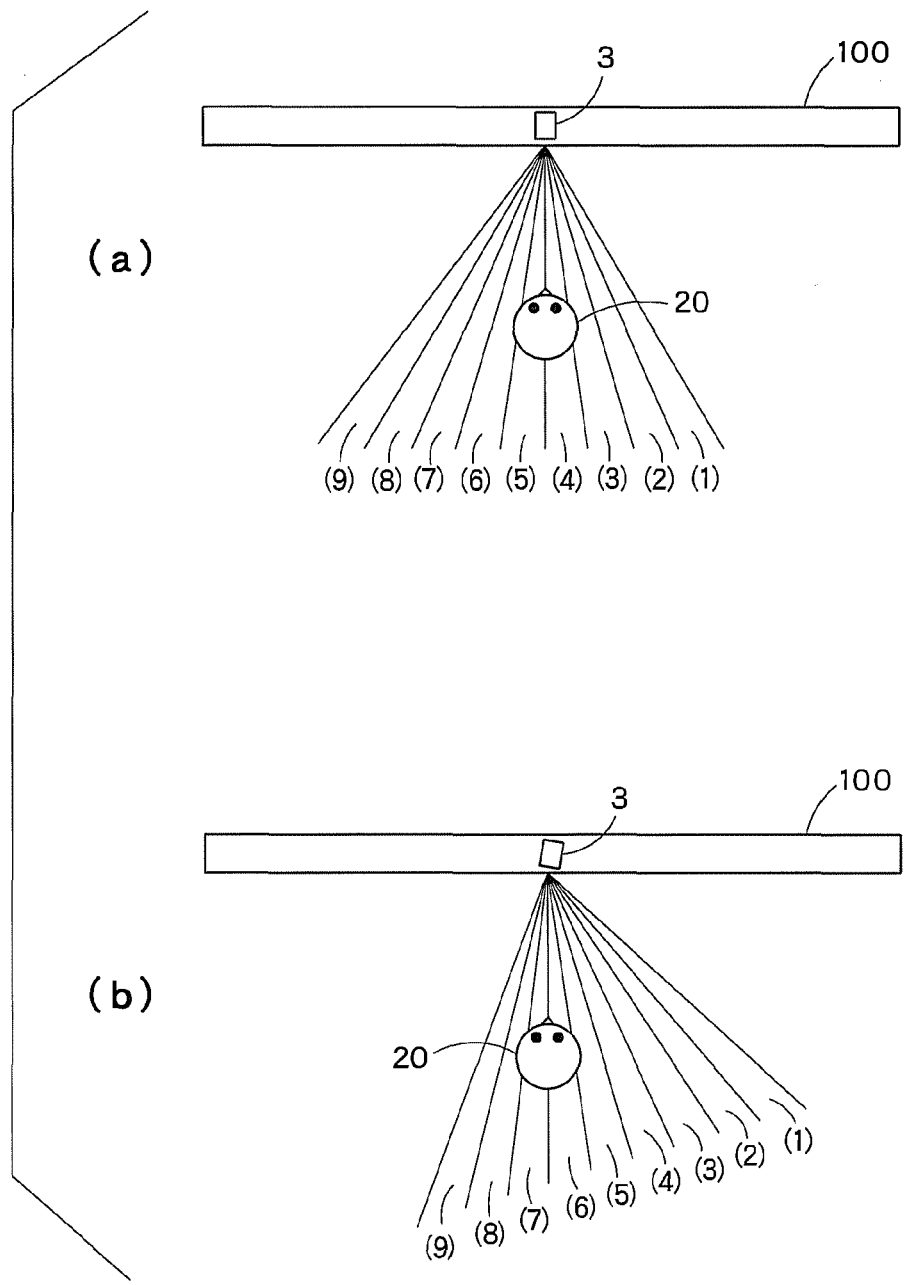
FIGS. 9(a) and 9(b) are both diagrams of rays of the first to ninth parallax images on the 3D viewing position check screen and a viewer 20 viewed from above.

FIGS. 9(a) and 9(b) are diagrams of rays of the first to ninth parallax images on the 3D viewing position check screen and the viewer 20 viewed from above. In FIGS. 9(a) and 9(b), signs (1) to (9) are respectively rays of the parallax images shown in FIGS. 8(1) to 8(9).

When there is no positional deviation of the camera 3, as shown in FIG. 9(a), the fourth parallax image comes into the right eye of the viewer 20 and the fifth parallax image comes into the left eye of the viewer 20. Therefore, the viewer 20 sees the guide character 32 of the double circle in the guide display 31. On the other hand, as shown in FIG. 9(b), when the camera 3 deviates in the right direction viewed from the video processing apparatus 100, the viewer detector 13 recognizes that the viewer 20 is present in the left direction compared with a case in which there is no positional deviation of the camera 3. Therefore, the first to ninth parallax images are output to the left side viewed from the video processing apparatus 100 by an amount of deviation of the camera 3. In the case of FIG. 9(b), the sixth parallax image comes into the right eye of the viewer and the seventh parallax image comes into the left eye of the viewer. Therefore, the viewer sees the circle with his right eye and sees the triangle with his left eye.

(6) After the viewing area is generated, the liquid crystal panel 1 displays a slide bar for camera adjustment on the 3D viewing position check screen (step S10). Camera calibration in this embodiment is performed on condition that the position of the viewer does not change. Therefore, a message (e.g., "please perform camera adjustment without changing your viewing position.") is displayed on the 3D viewing position check screen so that the viewer will not change his viewing position while adjusting the camera.

Figure 10:
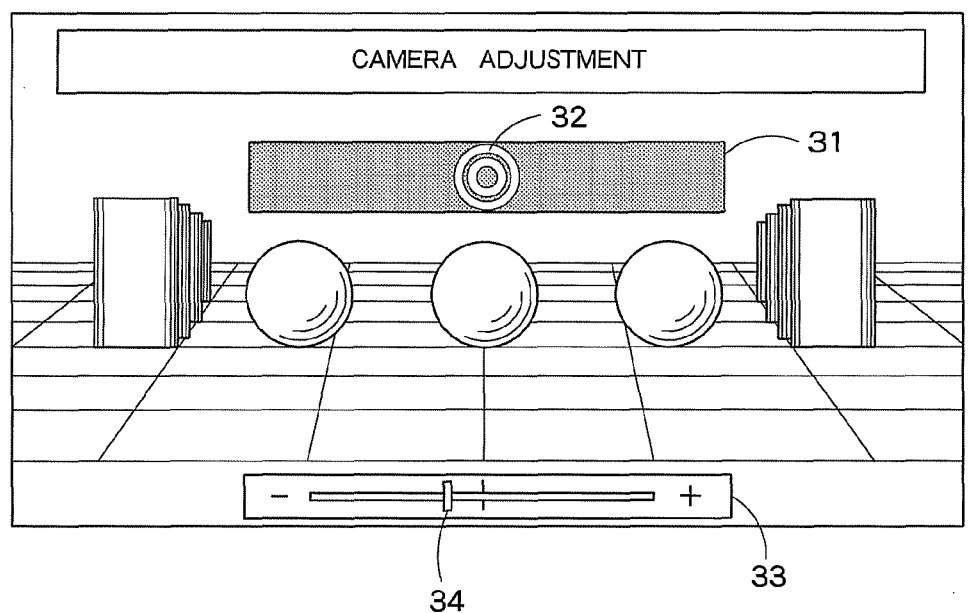
FIG. 10 shows an example of the 3D viewing position check screen on which a slide bar is displayed.

FIG. 10 shows an example of the 3D viewing position check screen (a camera adjustment screen) on which the slide bar is displayed. As shown in FIG. 10, a slide bar 33 including a knob 34 is provided in a lower part of the 3D viewing position check screen. The viewer can move the position of the knob 34 to the left and right using a direction key or the like of the remote controller. The viewer can change an output direction of the first to ninth parallax images on the 3D viewing position check screen by moving the knob 34. In other words, the viewer can move the viewing area. For example, when the viewer moves the knob 34 from the center of the slide bar 33 to the left side, the first to ninth parallax images are output in the left direction viewed from the viewer. When the viewer moves the knob 34 from the center of the slide bar 33 to the right side, the first to ninth parallax images are output in the right direction viewed from the viewer.

When the viewer performs the camera adjustment for the first time, the knob 34 is displayed in the center of the slide bar 33. When the viewer has performed the camera adjustment, the knob 34 is displayed in a position corresponding to a correction amount calculated last time.

(7) The image adjuster 15 (the viewing area controller 15') determines whether the position of the knob 34 changes (step S11). When the position of the knob 34 changes, the processing proceeds to step S12.

(8) When the position of the knob 34 changes, the image adjuster 15 (the viewing area controller 15') changes the output direction of the first to ninth parallax images according to the position of the knob 34 (step S12). In other words, the image adjuster 15 (the viewing area controller 15') changes the output direction of the first to ninth parallax images on the 3D viewing position check screen according to an instruction from the viewer who does not change his viewing position.

A relation between the position of the knob 34 and the output direction of the first to ninth parallax images on the 3D viewing position check screen is explained with reference to FIG. 11. FIGS. 11(1) and 11(2) are diagrams of rays of the first to ninth parallax images on the 3D viewing position check screen and the viewer 20 viewed from above. The camera 3 shifts in the right direction as in FIG. 9.

When the knob 34 is located on the left side from the center of the slide bar 33 as shown in FIG. 10, the first to ninth parallax images are output in the left direction viewed from the viewer (the right direction viewed from the video processing apparatus 100) compared with FIG. 9(b). The viewing area moves in the left direction. In a state shown in FIG. 11(1), the fifth parallax image comes into the right eye of the viewer and the sixth parallax image comes into the left eye of the viewer. In this state, the viewer sees the double circle with his right eye and sees the circle with his left eye. The viewer still cannot see the double circle with both eyes.

When the knob 34 is located further on the left side, as shown in FIG. 11(2), the first to ninth parallax images are output further in the left direction viewed from the viewer 20 than in FIG. 11(1). The viewing area moves in the left direction. As a result, the fourth parallax image comes into the right eye of the viewer and the fifth parallax image comes into the left eye of the viewer. In this state, the viewer can see the double circle with both eyes.

When the viewer sees the double circle with both eyes, the viewer depresses a determination key of the remote controller. Note that the viewer may select an item having the same function from the menu screen instead of depressing the determination key of the remote controller.

(9) The light receiver 4 receives an infrared ray signal transmitted from the remote controller and determines whether the determination key of the remote controller is depressed (step S13). If the determination key is depressed, the processing proceeds to step S14.

(10) The correction amount calculator 18 calculates a correction amount of the position information according to Equation (1) below and stores the correction amount in the storage 17 (step S14).

$$\Delta x = Z1 \cdot (\tan\theta2 - \tan\theta1) \quad (1)$$

In this equation, $\Delta x$ represents the correction amount, $Z1$ represents the position of the viewer on the Z axis, $\theta1$ represents an output direction of the plural parallax images before the output direction is changed, and $\theta2$ represents an output direction of the plural parallax images in a state in which the viewer sees one of two parallax images in the center with his right eye and sees the other with his left eye.

In this embodiment, the angle $\theta1$ indicates an output direction of a parallax image at the time when the viewing area is generated in step S9 and the angle $\theta2$ indicates an output direction of the parallax image at the time when the determination key is depressed.

A relation among the parameters of Equation (1) is shown in FIG. 12. The angles θ1 and θ2 indicating the output directions of the parallax image are defined as angles formed by a normal L of the liquid crystal panel 1 and rays R1 and R2 of the parallax image. The ray R1 is a ray before the output direction of the parallax image is changed. The ray R2 is a ray after the output direction of the parallax image is changed. In FIGS. 12, x1 and x2 represent positions on the X axis and x1=Z1·tan θ1 and x2=Z1·tan θ2. For example, x1 represents the position of the viewer indicated by the position information before correction and x2 represents the position of the viewer (i.e., the true position of the viewer) indicated by the position information after correction.

Note that although the correction amount of the position information is calculated concerning only the X direction in the above explanation, a correction amount Δy can be calculated concerning the Y direction in the same manner as calculation concerning the X direction. In that case, a correction amount of the position information stored in the storage 17 is a combination (Δx, Δy) of the correction amount in the X direction and the correction amount in the Y direction. Means for adjusting the output direction of the parallax image is not limited to the slide bar 33.

As explained above, in this embodiment, the viewer changes the output direction of the parallax image without changing his viewing position to perform adjustment of the viewing area and calculate a correction amount for compensating for an error of the position information of the viewer. More specifically, the viewer moves the knob 34 of the slide bar 33 displayed on the 3D viewing position check screen such that the viewer can see the guide character 32 of the guide display 31 as the double circle with both eyes. The viewer calculates a correction amount from a movement amount of the knob 34.

Next, a modification related to another method of calculating a correction amount is explained. Contrary to the method of the camera calibration explained above, in this modification, the output direction of the parallax image is fixed and the position of the viewer is changed. FIG. 13 is a flowchart for explaining a video processing method (calibration of a camera) according to this modification. Steps S1 to S9 explained with reference to FIG. 6A above are the same in the modification. Therefore, explanation of the steps is omitted and steps following step S9 are explained with reference to FIG. 13.

(1) The liquid crystal panel 1 displays a message for urging the viewer to move from a present position (a position before the viewer moves) to a position where the viewer sees one of the two parallax images in the center among the plural parallax images with his right eye and sees the other parallax images with his left eye (step S21). As this message, for example, the liquid crystal panel 1 displays "please move to a position where you can see the double circle with both eyes and press the determination key.".

(2) The viewer detector 13 determines whether the determination key is depressed (step S22). If the determination key is depressed, the processing proceeds to step S23.

(3) When the determination key is depressed, the viewer detector 13 performs face recognition using a camera video and acquires position information of the viewer (step S23). At a point when the determination key is pressed, the viewer sees the guide character 32 of the double circle. Therefore, in this step, the viewer detector 13 acquires position information indicating a position where the viewer sees one of the two parallax images in the center with his right eye and sees the other with his left eye.

(4) The correction amount calculator 18 calculates, from the position information (X1, Y1) (calculated in step S3) indicating the position before the viewer moves and the position information (X2, Y2) (calculated in step S23) indicating the position after the viewer moves, a correction amount (Δx, Δy) using Equation (2) and stores the correction amount (Δx, Δy) in the storage 17 (step S24).

$$(\Delta x, \Delta y) = (X2, Y2) - (X1, Y1) \tag{2}$$

In other words, the correction amount calculator 18 calculates, as a correction amount, a difference between the position information (X1, Y1) before the movement and the position information (X2, Y2) after the movement.

As explained above, in this modification, the output direction of the parallax image is fixed and the viewing position of the viewer is changed to perform adjustment of the viewing area and calculate a correction amount for compensating for an error of the position information of the viewer. In other words, the viewer moves to a position where the user can see the guide character 32 of the guide display 31 as the double circle with both eyes and calculates a correction amount from the position information before and after the movement.

Note that although the various messages to the viewer are displayed on the liquid crystal panel 1 in the embodiment and the modifications, instead, the messages may be communicated to the viewer by sound using a speaker (not shown) of the video processing apparatus 100.

Next, a method of generating, using the correction amount (Δx, Δy) of the position information, an appropriate viewing area in viewing a stereoscopic video is explained.

(1) The viewer detector 13 supplies the position information (X1, Y1) of the viewer calculated from the camera video to the position information corrector 16.

(2) When the position information of the viewer is supplied from the viewer detector 13, the position information corrector 16 reads out the correction amount (Δx, Δy) of the position information from the storage 17, corrects the position information (X1, Y1) supplied from the viewer detector 13 using the correction amount (Δx, Δy), and obtains corrected position information (X1', Y1'). The corrected position information is calculated according to Equation (3). The position information corrector 16 supplies the corrected position information (X1', Y1') to the viewing area information calculator 14.

$$(X1', Y1') = (X1, Y1) + (\Delta x, \Delta y) \tag{3}$$

(3) As explained above, a viewing area including the position (X1', Y1') is generated by the viewing area information calculator 14 and the image adjuster 15 (the viewing area controller 15'). More specifically, first, the viewing area information calculator 14 calculates a control parameter using the corrected position information (X1', Y1'). The image adjuster 15 adjusts a parallax image using the control parameter calculated by the viewing area information calculator 14 and supplies the parallax image to the liquid crystal panel 1. In the case of the video processing apparatus 100', the viewing area controller 15' controls the apertural area controller 2' using the control parameter calculated by the viewing area information calculator 14.

(4) The liquid crystal panel 1 displays an image adjusted by the image adjuster 15. In the case of the video processing apparatus 100', the liquid crystal panel 1 displays an image supplied from the parallax image converter 12.

As explained above, when the viewer views a stereoscopic video, position information of the viewer is corrected using a correction amount and a viewing area is generated in a corrected position. Consequently, even when positional deviation of a camera occurs, it is possible to generate a viewing area in which the viewer is set.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A video processing apparatus comprising:
a viewer detector configured to perform face recognition using a video photographed by a camera and acquire position information of a viewer;
a correction amount calculator configured to calculate a correction amount for compensating for an error of the position information involved in deviation of an attaching position of the camera;
a position information corrector configured to correct the position information using the correction amount calculated by the correction amount calculator;
a viewing area information calculator configured to calculate, using the position information corrected by the position information corrector, a control parameter for setting a viewing area in which the viewer is set;
a viewing area controller configured to control the viewing area according to the control parameter;
a display configured to display plural parallax images that the viewer present in the viewing area can observe as a stereoscopic video, the display being configured to display a 3D viewing position check screen including plural parallax images, two parallax images in a center among the plural parallax images including a common guide character not present in the other parallax images; and
an apertural area controller configured to output the plural parallax images displayed on the display in a predetermined direction.

2. The video processing apparatus of claim 1, wherein
the viewing area controller changes, according to an instruction from the viewer who does not change his viewing position, an output direction of the plural parallax images on the 3D viewing position check screen, and
the correction amount calculator calculates the correction value according to Equation (1), $$\Delta x = Z1 \cdot (\tan \theta 2 - \tan \theta 1) \quad (1)$$

where, $\Delta x$ represents the correction value, $Z1$ represents a position of the viewer on a Z axis, $\theta 1$ represents an output direction of the plural parallax images before the output direction is changed, and $\theta 2$ represents an output direction of the plural parallax images in a state in which the viewer sees one of the two parallax images in the center with his right eye and sees the other with his left eye.

3. The video processing apparatus of claim 2, wherein the viewing area controller changes, according to a position of a knob of a slide bar that is displayed on the 3D viewing position check screen and can be operated by the viewer, the output direction of the plural parallax images on the 3D viewing position check screen.

4. The video processing apparatus of claim 2, wherein
the correction amount calculator stores the calculated correction amount in a storage, and
when the position information is supplied from the viewer detector, the position information corrector reads out the correction amount from the storage and corrects the position information using the read-out correction amount.

5. The video processing apparatus of claim 2, wherein, when the viewer detector does not detect the viewer or detects plural viewers, the display displays an error message.

6. The video processing apparatus of claim 1, wherein
the viewer detector acquires first position information indicating a position before the viewer moves and second position information indicating a position after the viewer moves, the position being a position where the viewer sees one of the two parallax images in the center with his right eye and sees the other with his left eye, and
the correction amount calculator calculates, as the correction amount, a difference between the first position information and the second position information.

7. The video processing apparatus of claim 6, wherein
the correction amount calculator stores the calculated correction amount in a storage, and
when the position information is supplied from the viewer detector, the position information corrector reads out the correction amount from the storage and corrects the position information using the read-out correction amount.

8. The video processing apparatus of claim 6, wherein, when the viewer detector does not detect the viewer or detects plural viewers, the display displays an error message.

* * * * *